(12) United States Patent
Fredriksson et al.

(10) Patent No.: US 10,805,509 B2
(45) Date of Patent: Oct. 13, 2020

(54) IMAGING SYSTEM FOR A MOTOR VEHICLE

(71) Applicants: Peter Fredriksson, Linköping (SE); Madeleine Persson, Linköping (SE); Filip Tornqvist, Åtvidaberg (SE)

(72) Inventors: Peter Fredriksson, Linköping (SE); Madeleine Persson, Linköping (SE); Filip Tornqvist, Åtvidaberg (SE)

(73) Assignee: VEONEER SWEDEN AB, Vargarda (SE)

( * ) Notice: Subject to any disclaimer, the term of this patent is extended or adjusted under 35 U.S.C. 154(b) by 0 days.

(21) Appl. No.: 16/328,978

(22) PCT Filed: Aug. 31, 2017

(86) PCT No.: PCT/EP2017/071825
§ 371 (c)(1),
(2) Date: Feb. 27, 2019

(87) PCT Pub. No.: WO2018/041928
PCT Pub. Date: Mar. 8, 2018

(65) Prior Publication Data
US 2019/0208093 A1    Jul. 4, 2019

(30) Foreign Application Priority Data
Sep. 1, 2016 (EP) .................................. 16186812

(51) Int. Cl.
*H04N 5/225* (2006.01)
*G03B 17/56* (2006.01)
(Continued)

(52) U.S. Cl.
CPC ........... *H04N 5/2253* (2013.01); *B60R 11/04* (2013.01); *G03B 17/02* (2013.01); *G03B 17/561* (2013.01);
(Continued)

(58) Field of Classification Search
CPC .. H04N 5/2253; H04N 5/52254; G03B 17/02; B60R 11/04
See application file for complete search history.

(56) References Cited

U.S. PATENT DOCUMENTS 8,356,948 B2    1/2013    Onishi et al.
9,426,340 B2    8/2016    Song et al.
(Continued)

FOREIGN PATENT DOCUMENTS

DE    10 2011 108 594 A1    1/2013
EP         1 637 401 B    8/2008
(Continued)

OTHER PUBLICATIONS

International Search Report and Written Opinion of PCT/EP2017/071825, dated Oct. 13, 2017.

*Primary Examiner* — Christopher K Peterson
(74) *Attorney, Agent, or Firm* — Dickinson Wright PLLC

(57) ABSTRACT

An imaging system (1) for a motor vehicle, having a camera housing (2) and at least one camera module (3) to be mounted to the camera housing (2). The camera housing (2) is provided with an arrangement of at least two first abutments (4,5,6) with a defined geometry and orientation at which the camera module (2) abuts, wherein the camera module (3) is spring loaded against the first abutments (4,5,6) with at least one spring element (7).

12 Claims, 4 Drawing Sheets

(51) Int. Cl.
*G03B 17/02* (2006.01)
*B60R 11/04* (2006.01)

(52) U.S. Cl.
CPC ......... *H04N 5/2252* (2013.01); *H04N 5/2254* (2013.01); *H04N 5/2257* (2013.01)

(56) References Cited

U.S. PATENT DOCUMENTS

| | | | |
|---|---|---|---|
| 9,580,023 B2 | 2/2017 | Bruss et al. | |
| 2012/0099849 A1 | 4/2012 | Onishi et al. | |
| 2014/0375809 A1* | 12/2014 | Song | H04N 5/2252 348/148 |
| 2015/0326759 A1* | 11/2015 | Mukai | G03B 17/02 348/374 |
| 2015/0326760 A1 | 11/2015 | Knutsson et al. | |
| 2016/0088199 A1* | 3/2016 | Okamura | H04N 5/2252 348/374 |
| 2016/0255255 A1* | 9/2016 | Urano | H04N 5/2254 348/164 |
| 2016/0337583 A1* | 11/2016 | Kang | H04N 5/2254 |
| 2017/0023848 A1* | 1/2017 | Halsey | G03B 17/561 |

FOREIGN PATENT DOCUMENTS

| | | |
|---|---|---|
| EP | 2 942 939 | 11/2015 |
| EP | 2 736 769 B1 | 10/2017 |

\* cited by examiner

IMAGING SYSTEM FOR A MOTOR VEHICLE

CROSS-REFERENCE TO RELATED APPLICATIONS

This application is a 35 U.S.C. § 371 national phase of PCT International Application No. PCT/EP2017/071825, filed Aug. 31, 2017 which claims the benefit of priority under 35 U.S.C. § 119 to European Patent Application No. 16186812.0, filed Sep. 1, 2016, the contents of which are incorporated herein by reference in their entirety.

FIELD OF THE INVENTION

The invention relates to an imaging system for a motor vehicle.

BACKGROUND

In the assembly process of an imaging system for a motor vehicle, the lens objective is usually aligned relative to the image sensor in order to compensate for manufacturing tolerances of the lens objective and tilt or misalignment of the image sensor, which would otherwise lead to a deterioration of the image quality. Once the optimal position and orientation of the lens objective has been determined, it is conventionally fixed relative to the image sensor by a glue joint between the lens objective and the front of the lens holder. However, since the lens objective is usually rotationally symmetrical around the optical axis, a roll angle displacement of the image sensor cannot be corrected by rotating the lens objective relative to the image sensor in the alignment process. Therefore, in particular for stereo systems but also for mono systems, a laborious roll alignment has to be performed during mounting of the camera modules into an external camera housing part by rotating one camera module around its optical axis.

Generally, in order to handle both mono and stereo camera systems, it is desired to share common production processes as much as possible in order to gain efficiency and throughput, hence a modular approach for the camera eyes. It is also critical to maintain focus over the temperature envelope for any automotive camera.

In the EP 2 942 939 A1 it is suggested that first and second rotation locking means are provided at the camera unit and the camera housing part, which cooperate to lock the camera module against rotation relative to the camera housing part. The advantage of the suggested solution is that the camera module is suited to be used both in mono and stereo systems without any modifications, and a laborious roll alignment during mounting of the camera modules into the camera housing part can be avoided.

Therefore a simple passive alignment of the camera module relative to the camera housing part is provided.

Furthermore it is known to provide several, preferably three abutments at the camera housing having a defined geometry and orientation at which the camera module of the imaging systems abuts to align the camera module in a predefined direction. The abutments may have for example conical or spherical surfaces to center the camera module. Furthermore the abutments define a plane having a predefined orientation to adjust the camera module in the predefined direction.

SUMMARY AND INTRODUCTORY DESCRIPTION

The problem underlying the present invention is to provide an imaging system with an improved attachment of the camera module at the camera housing.

The invention addresses the above-referenced object. According to the invention it is suggested that the camera module is spring loaded against the first abutments with at least one spring element.

In the known attachment, the camera module is attached via screws or the like after the camera module is positioned at the first abutments. This attachment may cause small deviations of the position and orientation of the camera module from the predefined position and orientation defined by the first abutments, because the attachment may affect the camera module because of the attachment forces can move the module into a different position. In this case the accuracy of the attachment does not only depend on the position and geometry of the first abutments but also on the position of final attachment for example of the screws. Furthermore, it is possible that the attachment causes tensions in the camera module or in the camera housing, when the position of the camera module defined by the abutments and defined by the attachment are deviating from each other.

According to the invention it is suggested that the camera module is spring loaded against the first abutments. The advantage of the suggested solution can be seen therein that because of the spring loading, a degree of freedom is introduced. Because of this degree of freedom an attachment of the camera module is enabled in which the final position and orientation of the camera module is only determined by the orientation and geometry of the first abutments. Therefore the camera module can be positioned and adjusted by the first abutments without or at least with less influence of the attachment into the predefined direction. Furthermore the fixation can be therefore realized with less tension in the camera module and in the camera housing. Furthermore, the fixation may be handled much easier by applying the spring load manually or with a suitable tensioning device without any tools or additional attachment means. The spring element is designed regarding the spring forces to fix the camera module in all possible driving situations, wherein it is further possible to compensate for small vibrations and to reduce therefore negative effects on the camera module and the signal generated therein resulting from for example off road driving or bad street conditions.

According to a preferred embodiment of the present invention it is suggested that the camera housing includes an opening through which the camera module extends, and the first abutments are arranged in a rim section of the camera housing adjacent to the opening, and the spring element is designed as a first ring, overlapping the first abutments. The camera module is therefore enclosed by the spring element pressing the camera module onto the first abutments. Furthermore, the spring forces may act at the outer circumferences of the camera module enclosing the camera module so that the camera module may be pressed with a centering effect onto the abutments. By applying the spring forces with the first ring it is possible to apply the spring forces in an equal distribution and the spring element can be designed, manufactured and assembled in the imaging system in a very easy manner.

The camera module may be provided with at least one first projection directed into radial direction. The first projection is directed in radial direction so that it may be preferably used to apply the necessary spring loading in axial direction onto the camera module and finally onto the first abutments. The axial direction is the length direction of the camera module and is identical with the mounting direction of the camera module.

In this case the camera module may engage preferably with the first projection into a recess of the camera housing or of a part fixed at the camera housing, wherein the recess is in axial direction of the camera module open and enables a relative movement of the camera module in the axial direction while it blocks a relative movement of the camera module in the circumferential direction at least in one step of the assembly process. The purpose of the first projection engaging in the recess is to fix the camera in a predetermined angular orientation with respect to the axial direction when mounting the camera module at the camera housing. Furthermore, the recess is in axial direction open, so that the camera module may perform a relative movement in the axial direction into the attachment position, while the recess may act in this case additionally as guidance for the camera module.

The first projections of the camera module may include, at a side facing to the spring element, an oblique surface which forms an angled orientation with respect to a plane defined by the first abutments of the camera housing, and the spring element is abutting at the oblique surface and is adapted to perform a relative movement versus the first projections with pressing the camera module against the first abutments. The advantage of the suggested solution is that the first projection is also used to initiate the movement towards the first abutments, by the spring element performing the relative movement and using the oblique surface to transfer the relative movement into an axial movement. In this case it is important, that the surfaces are directed oblique or angled versus the plane defined by the abutments, so that the relative movement of the spring versus the first projection is transformed to an axial movement towards the first abutments.

Furthermore, it is suggested that the camera housing is provided with at least one second projection with a second abutment. The second projection with the second abutment is used as an abutment for the spring element when the camera module is spring loaded into the attachment position. The second projection and second abutment is fixed at the camera housing or at a part connected with the camera housing and serve therefore to take up the reaction forces of the spring element which is necessary to apply the spring load to the camera module for the attachment.

Therefore, the first projection of the camera module is arranged preferably between the first and the second abutment, wherein the spring element is arranged between the second abutment of the second projection and the first projection pressing the camera module towards the first abutment.

Furthermore several, preferably three second projections are provided at the camera housing, and the second abutment is designed as a second ring attached at each of the second projections, wherein the first ring (the spring element) and the second ring is formed in a corresponding shape. The second abutment in form of the second ring provides an abutment which encloses the camera module completely in circumferential direction, so that the spring element can be supported at several points which are arranged preferably in identical distances in circumferential direction, so that the camera module is loaded with an equal distributed spring load. As the first and the second ring have a corresponding shape both parts can be used over their complete surfaces to apply the spring load and to take up the corresponding reaction forces.

The first ring (the spring element) is arranged rotatable with respect to the axial direction of the camera module to be rotated into an attachment position. The suggested solution enables a very easy mounting process, by inserting the camera module in a first step and rotating the first ring or spring element in a second step into the attachment position, wherein both steps can be performed without any additional tools or attachment means.

Furthermore, it is suggested that the camera housing includes a blocking structure which prevents a rotation of the first ring out of the attachment position. The blocking structure acts as a lock to prevent a movement of the first ring and therefore also of the camera module out of the attachment position.

The first ring may furthermore form several arc shaped openings which are arranged concentrically to the rotation axis through which the first projections of the camera housing are extending. The ring is therefore additionally fixed in a predefined position and can be arranged between the second and the first abutments.

Furthermore it is suggested that the camera housing is provided with a stopper limiting the rotation movement of the first ring. The position of the stopper defines the final attachment position of the first ring, so the handling person need to rotate the first ring just as far as possible until the relative movement is stopped by the stopper during the assembly process to reach the attachment position of the first ring.

BRIEF DESCRIPTION OF THE DRAWINGS

In the following the invention shall be illustrated on the basis of preferred embodiments with reference to the accompanying drawings, wherein.

DETAILED DESCRIPTION OF EMBODIMENTS OF THE INVENTION

Figure 1:
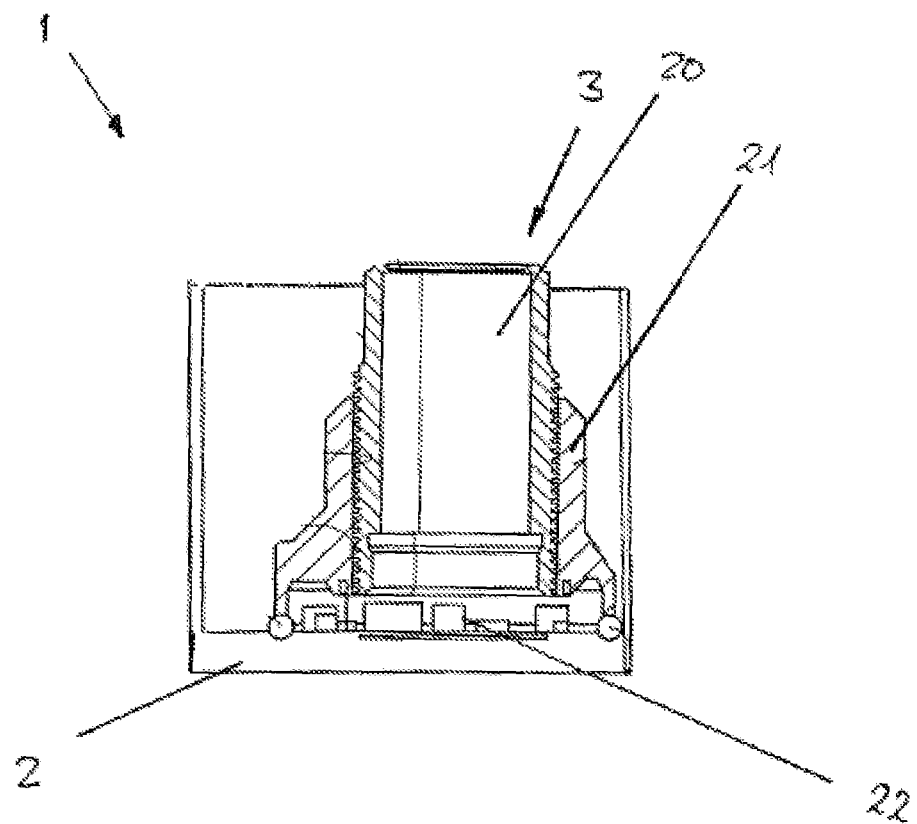
FIG. 1 shows an imaging system with the basic components.
Figure 2:
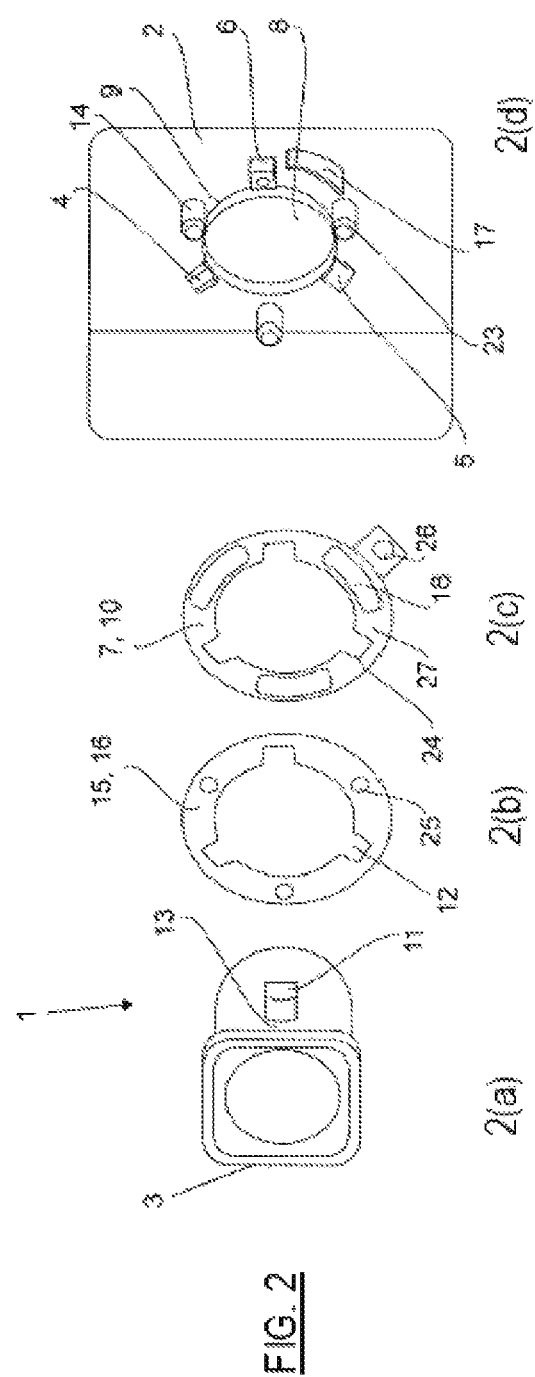
FIGS. 2(a)-(d) show the imaging system with the single components in an exploded view.

In FIG. 1 it is shown an imaging system 1 with the basic components including a camera housing 2 and a camera module 3. The camera module 3 is a preassembled unit, which includes a lens 20, a lens holder 21 and an optical sensor device 22 with the necessary electronic equipment to generate sensor signals and for processing the necessary data from the sensor signals for further processing. The camera module 3 needs to be orientated in a pre-defined direction, which is essential for the imaging system 1 to fulfill the requirements. The imaging system 1 may be used for example in active driver assistance system of vehicles and is in this case an essential part in the active and passive safety systems of the vehicle. Furthermore the imaging system 1 may be used in park assistance systems, in surveillance system and in vision systems in general.

The imaging system 1 is shown in FIGS. 2(a)-(d) in an exploded view. The camera housing 2 is provided with a circular opening 8 with three first abutments 4, 5 and 6 arranged in a rim section 9 adjacent to the opening 8. The first abutments 4, 5 and 6 are arranged equidistant to each other in angles of 120 degree and on a common radius with identical distances to the center of the opening 8. The camera module 3 includes a cylindrical basic body which is in this case the lens holder 21 shown in FIG. 1. The camera module 3 further includes three first projections 11, which are extending from the cylindrical body in radial direction to the outside perpendicular to the length axis A. The three first projections 11 are arranged also in equal distances to each other and in a common plane with identical distances to the front side of the camera module 3. Furthermore the three first projections 11 form an identical shape and orientation with an oblique surface 13 arranged at the side facing to the front side of the camera module 3.

The camera housing 2 is further provided with second projections 14 which are also arranged in the rim section 9 of the opening 8 between the first abutments 4, 5 and 6 on a common radius and with an angular distance of 120 degree. Alternatively, the second projections 14 may be also arranged on different radii and/or with different angles between them, for example, between 110 and 130 degree in circumferential direction to realize a poky yoke function. The second projections 14 are designed as from the bottom of the camera housing 2 upright standing cylindrical columns and are provided at the front sides with pins 23 having a smaller diameter. The second projections 14 may be realized for example by separated parts which are connected with the camera housing 2 via riveting, screw connection or by heat staking. Furthermore a blocking structure 17 in shape of a ramp is provided. The ramp is designed as a ring section which is arranged concentric to the center of the opening 8 and having in the circumferential clockwise directions, an increasing height. Furthermore a spring element 7 and a second abutment 15 are provided which are realized by a first ring 10 and a second ring 16. The second abutment 15 realized by the second ring 16 includes three openings 25 and is attached via the openings 25 at the pins 23 of the second projections 14 for example by riveting, stamping, securing rings, gluing or the like. The second ring 16 includes furthermore at the radial inner side three first recesses 12 and the first ring 10 includes also at the radial inner side three second recesses 24 having an identical cross shape and arrangement with distances of 120 degree to each other and with identical cross shape and arrangement to the first projections 11 of the camera module 3. In the first ring 10 are provided furthermore having three arc shaped openings 18, which are arranged equidistant to each other and concentric to the center of the first ring 10. The first ring 10 is provided additionally with a radial to the outside directed handle 26.

Figure 3:
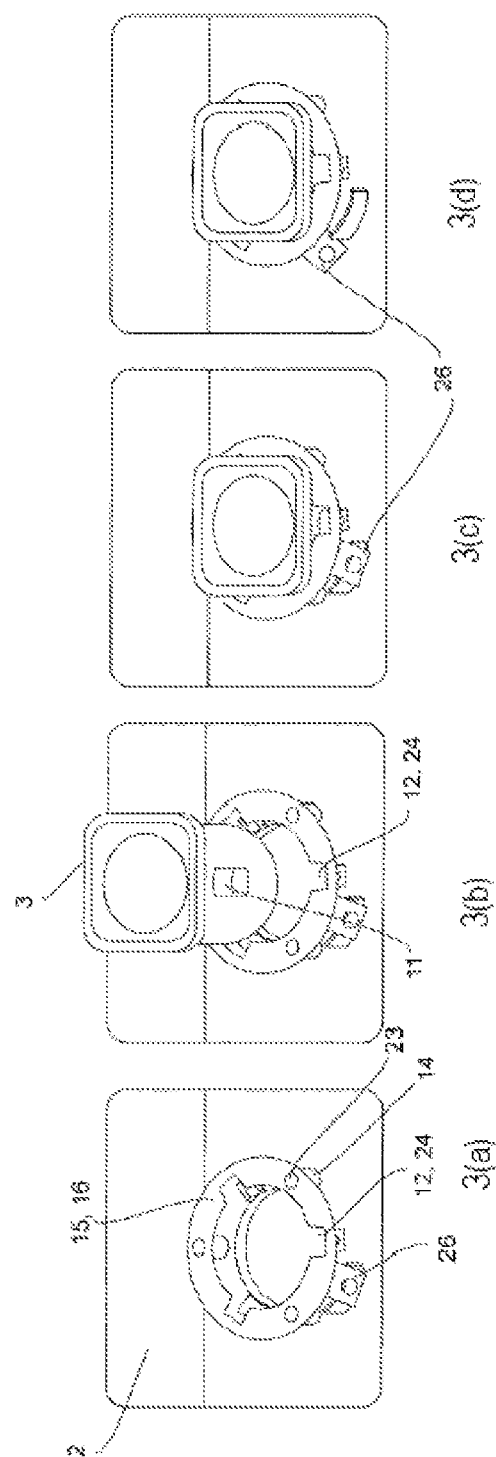
FIGS. 3(a)-(d) show the assembly steps of the attachment process.

The camera housing 2 is preassembled with the second projections 14 or it is produced as a single part as an injection mold. In a first step the spring element 7 is mounted with the arc shaped openings 18 on the second projections 14 in a position in which the handle 26 is arranged adjacent to the lower side of the blocking structure 17. The first ring 10 is rotatable within a limited angle because of the arc shaped openings 18. In a next step the second ring 16 is mounted with the openings 25 on the pins 23 of the second projections 14. The first ring 10 and the second ring 16 are positioned with the first and second recesses 12, 24 in identical positions, so that both recesses 12, 24 creating a common recess, which is shown in FIG. 3(a). The common recess created by the recesses 12 and 24 is positioned over the first abutments 4, 5 and 6. The position of the recesses 12 and 24 define the orientation, in which the camera module 3 may be inserted into the camera housing 2 like shown in FIG. 3(b). The recesses 12, 24 are in axial direction A open, so that the camera module 3 may be inserted in the axial direction A which is in this case also the mounting direction. The recesses 12, 24 prevent a rotation of the camera module 3 and act therefore as a guidance for the camera module 3 during the attachment movement into the final position shown in FIG. 3(c). Because of the arrangement of the recesses 12 and 24 over the first abutments 4, 5 and 6 the first projections 11 are positioned also over the first abutments 4, 5 and 6. The final fixation of the camera module 3 is performed by turning the first ring 10 (the spring element 7) in clockwise direction into the position shown in FIG. 3(d). The first ring 10 can be turned easily by grasping the handle 26, which is moved during the rotation over the blocking structure 17. When the first ring 10 is positioned in the final attachment position it is blocked against backwards rotation by abutting at the side of the blocking structure 17 like shown in FIG. 3(d).

Figure 4:
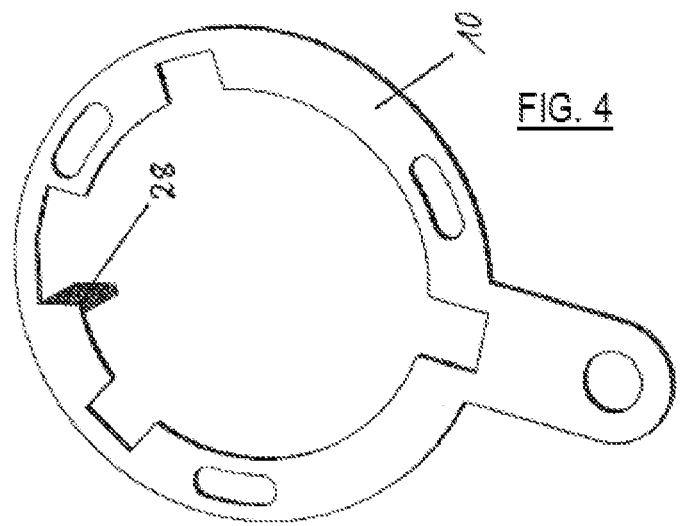
FIG. 4 shows the spring element.
Figure 5:
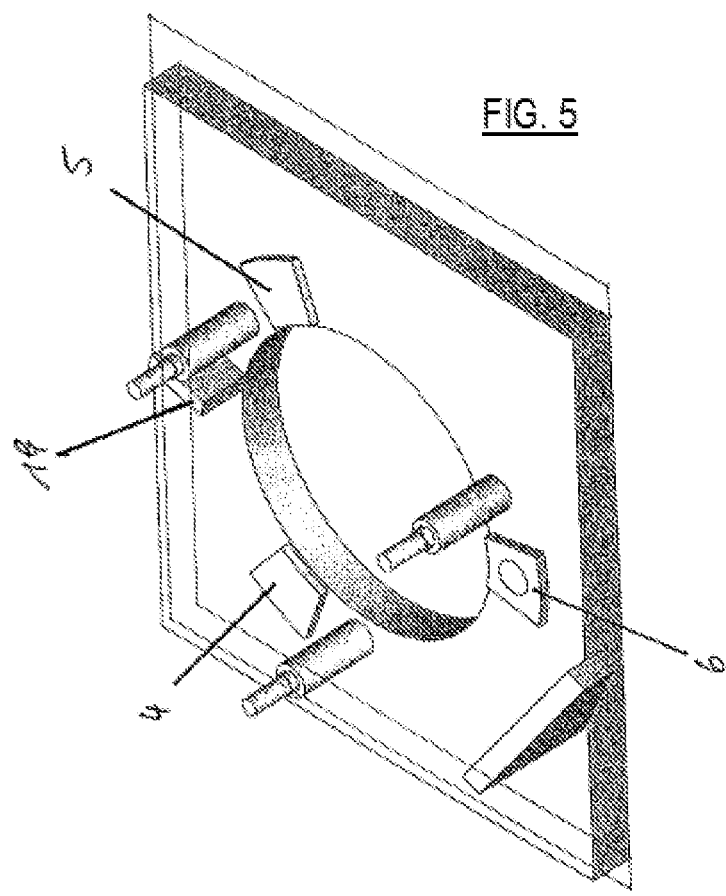
FIG. 5 shows the relevant section of the camera housing for mounting the camera module.

FIGS. 4 and 5 show another embodiment of the present invention which the first ring 10 is further provided with an in axial direction extending tongue 28 and the camera housing 2 is provided with a stopper 19 arranged in a defined position. The advantage of this solution is that the rotational movement of the first ring 10 is stopped when the tongue 28 abuts at the stopper 19, so the stopper 19 defines the final attachment position of the first ring 10.

Figure 6A:
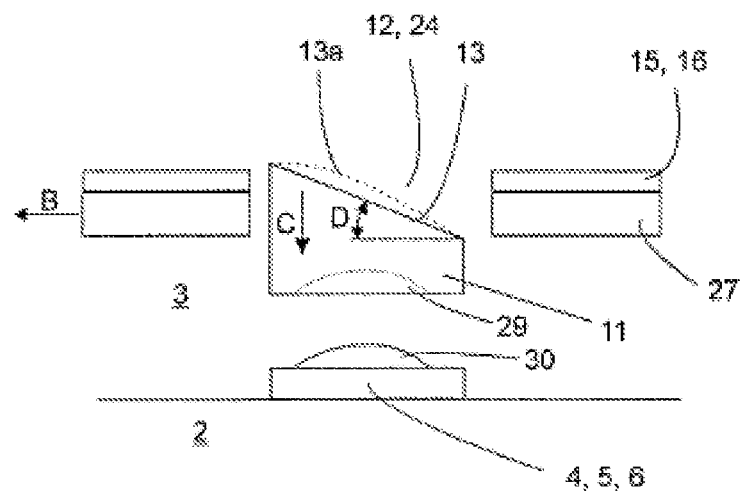
FIGS. 6(a) and (b) show an enlarged section of the module in two different positions in view from the side.
Figure 6B:
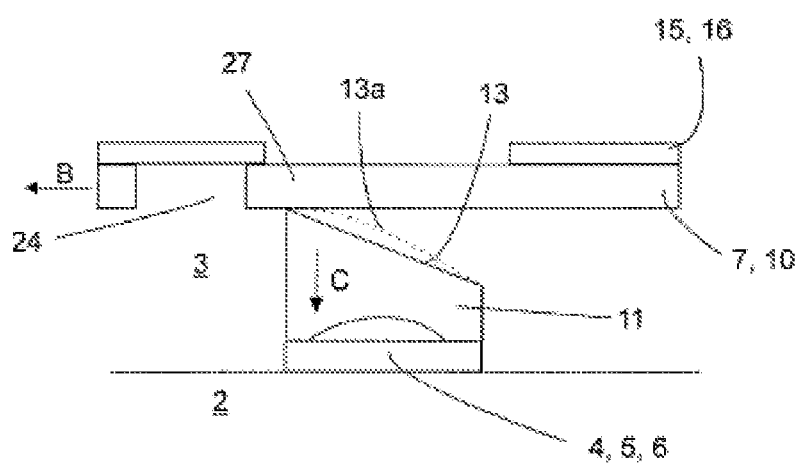

FIGS. 6(a) and (b) show the attachment movement in view from the side on one first projection 11. The first projection 11 includes an oblique surface 13 which encloses an angle D with the circumferential direction B. The surface 13 may be provided in an alternative 13a also a decreasing angle D in circumferential direction B which finally ends in a plateau feature with an angle of zero degree to the circumferential direction B at the left side of the first projection 11 shown in FIGS. 6(a) and (b) by the dashed line. The advantage of this embodiment is that the axial movement of the camera module 3 is thereby non-linear and decreasing; so that the camera module 3 may perform in the end phase an adjustment movement with a very high precision in a very small ratio of the axial movement related to the rotational movement of the first ring 10.

FIG. 6(a) shows the position of the first projection 11 and of the first ring 10 after the camera module 3 has been inserted and before the first ring 10 was turned, so the position corresponds to the position shown in FIG. 3(c). The camera module 3 extends with the first projections 11 through the recesses 12 and 24. The first ring 10 and the second ring 16 are not pressed against each other. When the first ring 10 is being rotated in the circumferential direction B, the first ring 10 starts to overlap the oblique surface 13 with a rim section 27 at the lower side. When the first ring 10 is further rotated, the first ring 10 is acts with the interaction of the oblique surface 13 against the second ring 16 (the second abutment 15), which prevents a further upwardly directed movement of the first ring 10, so that the first ring 10 presses the first projection 11 in the axial direction C which corresponds to the axial direction A in FIGS. 2(a)-2(d) towards the camera housing 2 and the first abutments 4, 5 and 6 arranged thereon. The first abutments 4, 5 or 6 are designed in this embodiment with a spherical surface 30, while the side of the first projections 11 facing to the first abutments 4, 5 or 6 are also designed as a spherical surface 29, wherein the spherical surface 29 of the first projection 11 is the negative surface of the spherical surface 30 of the first abutment 4, 5 or 6. The spherical surfaces 30 and 29 may be also designed in an alternative embodiment with the spherical surface 30 having the positive cam shape being arranged at the first projections 11 and the spherical surface 29 having the negative cam shape being arranged at the first abutments 4, 5 and 6. Furthermore, one or both of the spherical surfaces 29 or 30 may be also designed as cone-shaped recesses or cone-shaped cams.

The first ring 10 acts in this case as a spring element 7 which creates a spring load onto the first projection 11 and pressing the first projections 11 onto the first abutments 4, 5 or 6. The first projections 11 and the camera module 3 are adjusted by the spherical surfaces 29 and 30 in a predefined orientation and direction. Because there is no further connection by screws or rivets, the adjustment of the camera module 3 is only determined by the first abutments 4, 5 and 6, the first projections 11 and the spherical surfaces 29 and 30 arranged thereon. Instead of the spherical surfaces 29 and 30 also other geometries like conical or inclined surfaces 13 may be used, wherein the different first abutments 4, 5 and 6 may have also different surfaces 13 which may result in conjunction in a centering and adjustment function of the camera module 3.

The attachment process can be performed without any tools or additional attachment features. Furthermore, the spring loading of the camera module 3 has the advantage that small vibrations or shocks can be compensated. Therefore the signal or the vision generated by the camera module is much better. Furthermore the forces acting on the camera module 3 can be reduced. The spring load can be determined by dimensioning the first ring 10 and the second ring 16, wherein the spring load should be dimensioned to hold the camera module 3 under all normal driving conditions in position.

While the above description constitutes the preferred embodiment of the present invention, it will be appreciated that the invention is susceptible to modification, variation and change without departing from the proper scope and fair meaning of the accompanying claims.

The invention claimed is:

1. An imaging system for a motor vehicle, comprising,
a camera housing forming an opening,
a camera module mounted to the camera housing and extending through the opening wherein,
the camera housing is provided with at least two first abutments with a defined geometry and orientation at which the camera module abuts, the at least two first abutments are arranged in a rim section of the camera housing adjacent to the opening,
the camera module is spring loaded against the at least two first abutments with at least one spring element, and
the at least one spring element is provided in the form of a first ring, overlapping the rim section the camera housing is provided with a stopper for limiting the rotation movement of the first ring.

2. An imaging system as claimed in claim 1 further comprising, the camera module is provided with at least one first projection directed into a radial direction.

3. An imaging system as claimed in claim 2 further comprising,
the camera module engages with the at least one first projection into a first recess of the camera housing or of a part fixed at the camera housing, wherein
the first recess is open in an axial direction of the camera module and enables a relative movement of the camera module in the axial direction and blocks a relative movement of the camera module in a circumferential direction at least in one step of an assembly process.

4. An imaging system as claimed in claim 2 further comprising, the camera housing is provided with at least one second projection with at least one second abutment.

5. An imaging system as claimed in claim 4 further comprising,
the at least one first projection of the camera module is arranged between the at least one first and the at least one second abutment, wherein
the at least one spring element is arranged between the at least one second abutment of the at least one second projection and the at least one first projection pressing the camera module towards the at least one first abutment.

6. An imaging system as claimed in claim 4 further comprising at least two of the second projections are provided at the camera housing, and the at least one second abutment is designed as a second ring which is attached at each of the at least one second projections.

7. An imaging system as claimed in claim 6 further comprising, the first ring and the second ring are formed of a corresponding shape.

8. An imaging system for a motor vehicle comprising,
a camera housing forming an opening,
a camera module mounted to the camera housing, the camera module is provided with at least one first projection directed in a radial direction, the camera module extending through the camera housing opening,
the camera housing is provided with at least two first abutments with a defined geometry and orientation at which the camera module abuts, the at least two first abutments are arranged in a rim section of the camera housing adjacent to the opening,
the camera module is spring loaded against the at least two first abutments with at least one spring element provided in the form of a first ring, overlapping the rim section,
the at least one first projections of the camera module comprises at a side facing to the at least one spring element an oblique surface which forms an angled orientation with respect to a plane defined by the at least two first abutments of the camera housing, and
the at least one spring element is abutting at the oblique surface and is adapted to perform a relative movement versus the at least one first projection with a pressing the camera module against the at least two first abutments.

9. An imaging system as claimed in claim 8 further comprising, the camera housing is provided with a stopper for limiting the rotation movement of the first ring.

10. An imaging system for a motor vehicle comprising,
a camera housing forming an opening,
a camera module mounted to the camera housing, the camera module is provided with at least one first projection directed in a radial direction, the camera module extending through the camera housing opening,
the camera housing is provided with at least two first abutments with a defined geometry and orientation at which the camera module abuts, the at least two first abutments are arranged in a rim section of the camera housing adjacent to the opening,
the camera module is spring loaded against the at least two first abutments with at least one spring element provided in the form of a first ring, overlapping the rim section, the first ring is arranged rotatable with respect to an axial direction of the camera module to be rotated into an attachment position.

11. An imaging system as claimed in claim 10 further comprising, the camera housing includes a blocking structure which prevents a rotation of the first ring out of the attachment position.

12. An imaging system as claimed in claim 10 further comprising, the first ring forms several arc shaped openings which are arranged concentrically to a rotation axis through which at least one first projection of the camera housing extends.

* * * * *